Patented July 12, 1938

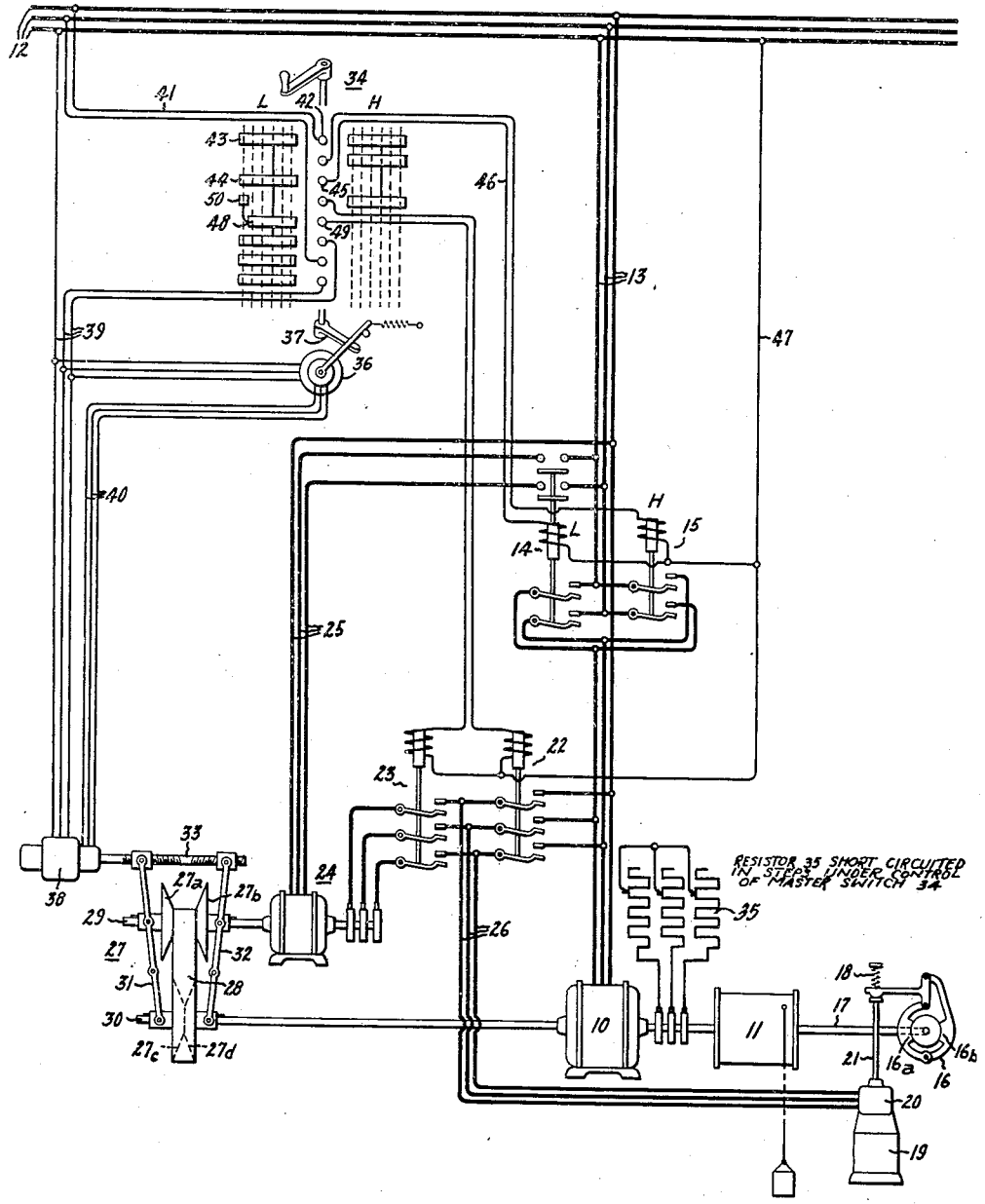

2,123,747

UNITED STATES PATENT OFFICE 2,123,747

CONTROL SYSTEM

Carl Schiebeler, Berlin-Charlottenburg, Germany, assignor to General Electric Company, a corporation of New York Application February 23, 1937, Serial No. 127,240 In Germany February 29, 1936

10 Claims. (Cl. 172—179)

This invention relates to control systems, more particularly to systems for controlling the operation of electric motors, and it has for an object the provision of a simple, reliable, and improved system of this character.

More particularly, the invention relates to control systems for alternating current induction motors connected to drive hoists and the like, which are subjected at times to overhauling loads, and a further object of the invention is the provision of means for controlling the motor to lower an overhauling load.

A further object of the invention is the provision of means for controlling an alternating current motor to lower an overhauling load at any one of a plurality of subsynchronous speeds.

In carrying the invention into effect in one form thereof, a master switch is provided together with a mechanical brake for controlling the motor speed. Mechanism including an electric motor is provided for operating the brake, and means driven by the main driving motor supply a voltage to the brake operator motor that varies with variations in the speed of the main driving motor. A variable speed driving mechanism is interposed in the driving connections between the main driving motor and the voltage supplying means driven thereby, and means actuated in response to operation of the master switch are provided for varying the drive ratio of the variable speed drive.

For a better and more complete understanding of the invention, reference should now be had to the following specification and to the accompanying drawing, the single figure of which is a simple, diagrammatic illustration of an embodiment of the invention.

Referring now to the drawing, an electric motor 10 is mechanically connected to the winding drum 11 of a hoist, or similar apparatus, which under certain operating conditions, may impose an overhauling load on the motor. The motor 10 is illustrated as an alternating current motor of the wound rotor induction type. Power is supplied to this motor from a suitable source represented by the three supply lines 12 to which the primary winding of the motor is arranged to be connected through conductors 13 by means of suitable reversing switching mechanism illustrated as a pair of electromagnetically operated contactors 14 and 15. When contactor 14 is closed, the motor 10 is energized for rotation in such a direction as to lower the load, and when contactor 15 is closed, motor 10 is energized for rotation in the hoisting direction. The drum of a mechanical brake 16 is mounted on the motor shaft 17. Suitable means, illustrated as a spring 18, are provided for biasing the braking shoes 16a, 16b to the braking position, and operating means 19 are provided for releasing the brake shoes. This brake operating means is actuated by an electric motor 20 and is preferably in the form of an electrohydraulic operating mechanism, comprising a piston immersed within a cylinder containing oil or other suitable fluid and connected by means of a connecting rod 21 to the arm of the brake shoe actuating mechanism, and a centrifugal pump impeller within the cylinder driven by the electric motor 20 for producing a liquid pressure against the piston of sufficient magnitude to release the brake shoes 16a, 16b against the bias of the spring 18.

The contactor 22 is provided for connecting the motor 20 of the hydraulic operating mechanism to the source 12 to effect release of the brake. Another contactor 23 is provided for connecting the motor 20 to a source of voltage 24 that varies with variations in the speed of the main driving motor 10. This source of voltage 24 is illustrated as a frequency changer having its primary windings connected to the source 12 through conductors 25 and upper contacts of the lowering contactor 14, and having its secondary winding connected through contactor 23 and conductors 26 to the motor 20 of the brake operating mechanism. The drive shaft of the frequency changer 24 is connected through a suitable variable speed driving device to the drive shaft of the main motor 10. While this variable speed driving device 27 may be of any suitable type, it is illustrated as a Reeves pulley. Briefly, a Reeves pulley comprises a pair of tapered pulleys 27a, 27b and a second pair of tapered pulleys 27c, 27d connected by an endless belt 28. The pair of tapered pulleys 27a, 27b are slidably mounted on the shaft 29 and similarly, the pair of pulleys 27c, 27d are slidably mounted on the shaft 30. Thus when the pulleys of each pair are separated the maximum distance, their effective diameter is a minimum and likewise, when the pulleys are closest together, their effective diameter is maximum. Thus, the tapered pulleys 27a and 27b, which are illustrated as being separated from each other the maximum distance, present the minimum effective diameter to the belt 28 and conversely, the pair of tapered pulleys 27c, 27d which are illustrated moved close together present maximum effective diameter to the belt 28. By separating one pair of pulleys while moving the other pair of pulleys together, a smooth, stepless variation in the drive ratio between the shafts 29 and 30 is obtained, and for this purpose a pair of pivoted arms 31, 32 actuated by a screw shaft 33 are provided. When the screw 33 is rotated in one direction, the pulleys 27a, 27b are separated and the pulleys 27c, 27d are moved toward each other, and when the screw 33 is rotated in the reverse direction, the reverse action takes place.

A multiposition reversing type master switch 34 is provided for controlling the starting, stopping, speed, and direction of rotation of the motor 10. A variable resistance 35 is included in the secondary circuit of the motor 10. When an alternating current motor is taking power from the line and driving a load, its speed can be controlled by varying the amount of secondary resistance. Master switches such as the switch 34 are usually provided with a number of segments and fingers for varying the resistance in the secondary circuit of the motor. Such segments and fingers have been omitted from the drawing in the interest of simplicity.

It is well known that if a wound rotor induction motor is overhauled by its load, it develops no braking torque except at speeds above synchronism. Increasing the secondary resistance when the motor is being overhauled serves only to increase the motor speed. Increasing the secondary resistance decreases the speed of a wound rotor induction motor only when the motor is taking power from the line to drive the load. Thus by utilizing the mechanical brake 16 to impose a motoring load on the motor when its regular load becomes overhauling, the speed of the motor can be controlled by means of the master switch 34 and the secondary resistance 35 controlled by the master switch, and the motor thus caused to operate at subsynchronous speeds.

In order that the brake 16 may be utilized to regulate the speed of the main motor 10, i. e., to maintain the speed of the main motor 10 substantially constant at any one of a plurality of desired subsynchronous speeds, it is necessary that the brake operating mechanism should be controlled by variations in the speed of the main motor. Consequently, when it is desired to lower an overhauling load, the motor 20 of the brake operating mechanism is connected to the frequency changer 24 driven by the main motor 10. The frequency and magnitude of the voltage at the slip rings of the frequency changer vary inversely with the speed of the main motor. Thus, at zero sped of the main motor the frequency changer 24 operates as a stationary transformer, and the frequency and magnitude of the slip ring voltage are maximum. Conversely, at synchronous speed of the main motor the magnitude and frequency of the slip ring voltage become zero, assuming the variable speed drive adjusted for one to one driving ratio. Since the speed of the operator motor 20 depends upon the frequency of the applied voltage, it will operate at maximum speed when the frequency changer 24 is at zero speed, and will operate at zero speed when the frequency changer is running at synchronous speed. Thus, the speed of the brake operator motor 20 is seen to be inversely proportional to the speed of the main driving motor 10.

The lifting force characteristic of the electrohydraulic brake operating mechanism is not variable over the entire speed range of the operator motor 20. For example, this characteristic may be such that the brake is fully released at 80 per cent of full speed on motor 20 and at 50 per cent speed the brake may be applying 60 per cent of full braking torque. This is due to the law governing centrifugal pumps which is that the pressure exerted varies as the square of the impeller speed. Thus it will be seen that the range of speeds of the main motor 10 between which the brake is set or fully released is a narrow one, if frequency changer 24 is geared 1 to 1 to motor 10. Consequently, in order that the brakes may be utilized to cause the main motor 10 to produce a motoring torque for a plurality of subsynchronous speeds over a wide range, it is necessary that the frequency changer 24 should operate at somewhere near the same speed for each subsynchronous speed of the main driving motor 10. This is accomplished by varying the drive ratio of the variable speed drive in response to actuation of the master switch 34. To this end, the operating lever of the master switch is connected to the screw shaft 33 of the variable speed drive. Although any suitable connecting means, mechanical or electrical, may be utilized for this purpose, electrical self-synchronous motion transmitting means are preferred.

Such means comprise an electrical motion transmitting device 36 mechanically connected to the master switch shaft 37, and a motion receiving device 38 connected to the screw shaft 33 of the variable speed device 27. Each of these devices may be physically similar to a wound rotor induction motor. The stator windings of these devices are connected through conductors 39 and master switch 34 to the alternating current supply source 12, and the rotor windings of both devices are connected together by means of conductors 40. When thus connected and the rotor member of the transmitting device rotated from one position to another, the rotor of the receiving member will rotate to a corresponding position.

For any given load suspended from the hoist drum 11, the braking torque required to obtain any given speed reduction will be the sum of the torque produced by the load plus the motor torque delivered by the motor at that speed when operating on the speed torque curve corresponding to the resistance then in circuit. With this in mind, initial adjustments are made so that the voltage and frequency from the frequency changer are such that the braking torque produced by the brake will be sufficient to reduce the speed of the main motor to a value at which it will be delivering motor torque instead of regenerative torque.

With the foregoing understanding of the elements and their arrangement in the system, the operation of the system will readily be understood from the following detailed description.

If it is desired to lower the load, the master switch 34 is operated from the central or off position in which it is shown to the left-hand or lowering position. As the master switch is operated through its successive positions, the rotor of the transmitting device 36 is rotated a corresponding amount and, the rotor of the receiver 38 is likewise rotated a corresponding amount. The direction of rotation of the screw 33 produced by operation of the master switch to the left-hand positions is such that the pulleys 27a, 27b are forced together and the pulleys 27c, 27d are separated. Thus, when the master switch 34 is in its fifth or full-speed lowering position, the frequency changer 24 is operating at approximately 20 per cent synchronous speed.

As the master switch passed through its first lowering position, an energizing circuit was established for the operating coil of the lowering contactor 14. This circuit is traced from the upper supply line 12 through conductor 41, finger 42, segments 43 and 44, finger 45, conductor 46, operating coil of contactor 14 and thence by conductor 47 to the lower supply line 12. Contactor 14 then closed its contacts in response to energization and connected the motor 10 to the source 12 for rotation in a direction to lower the load. Contactor 14 in closing also connected the terminals of the frequency changer 24 to the source 12. Simultaneously, an energizing circuit was established for the operating coil of contactor 23 that is traced from the power segment 43 to segments 48, finger 49, operating coil of contactor 23 to the lower side of the supply source 12. Contactor 23 closed in response to energization and connected the slip rings of the frequency changer 24 to the operator motor 20. At the instant the master switch 34 is moved to its first position, the main driving motor 10 is of course stationary and likewise, the frequency changer 24 is stationary. Therefore, the frequency changer acts as a stationary transformer, and voltage of maximum frequency is supplied to the operator motor 20, thereby causing this motor to rotate at maximum speed and produce a force to release the brake against the tension of the spring 18.

In actual operation, the operator usually moves the master switch quickly in one motion from the off position to the full on position. As the master switch passes through its successive lowering positions, the secondary resistance 35 of the main driving motor 10 is short-circuited in steps usually timed automatically and the motor accelerated to full speed. Simultaneously, the speed of the frequency changer 24 is being reduced and as long as the speed of the motor 10 does not exceed the speed at which it is designed to run on any position of the master switch, the frequency of the voltage supplied from the frequency changer 24 to the brake operator motor 20 is sufficient to maintain the brake released. On the fifth or full-speed position of the master switch, the energizing circuit of the contactor 23 is interrupted, and this contactor opens its contacts to disconnect the brake operator motor 20 from the frequency changer 24. Substantially simultaneously, an energizing circuit is completed for the operating coil of contactor 22 which closes to connect the brake operator motor to the supply source 12. As a result of this, voltage of full-line frequency is supplied to operator motor 20 which therefore operates at substantially synchronous speed and maintains the brake released as long as the master switch 34 is maintained in its full-speed lowering position.

If the load should overhaul the main motor 10, the speed of the latter will increase above synchronous speed. Assuming that the operator desires to lower the load at a subsynchronous speed, it therefore becomes necessary for him to notch the master switch handle back to one of the subsynchronous speed positions. Assuming that it is desired to lower the load at a subsynchronous speed corresponding to the third lowering position of the master switch, the handle of the master switch is notched back to the third position. As a result of this movement, such portions of the secondary resistance 35 are inserted in the secondary circuit of the main motor 10, contactor 22 opens and 23 closes and simultaneously, the drive ratio of the variable speed device 27 is increased. If, after this movement has been completed, the speed of the main motor 10 is above the speed at which it should operate on the third point of the master switch, the speed of the frequency changer 24 will be higher and its slip ring frequency and voltage will be lower than it should be if the motor 10 were operating at the correct speed. Consequently, the speed of the brake operator motor 20 will be correspondingly reduced, and the spring 18 will apply the brake shoes sufficiently to reduce the speed of the motor 10 to the correct value. Likewise, if the speed of the motor 10 is less than the correct value, the frequency of the voltage supplied from the frequency changer 24 to the operator motor 20 will increase and thereby reduce the braking force of the brake a corresponding amount. It will thus be seen that the speed of the motor 10 is regulated to a desired subsynchronous value for each position of the master switch in the lowering direction.

It will be observed that for all hoisting positions, the contactor 23 is open and the motor 20 of the brake operating mechanism disconnected from the slip rings of the frequency changer whilst the contactor 22 is closed so that the motor 20 is connected to the supply source 12. As a result voltage of full-line frequency is supplied to the operator motor 20, and the brake is maintained released for all hoisting positions.

Although in accordance with the provisions of the patent statutes, this invention is described as embodied in concrete form, it will be understood that the apparatus and connections shown are merely illustrative, and that the invention is not limited thereto, since alterations and modifications will readily suggest themselves to persons skilled in the art without departing from the true spirit of the invention or from the scope of the annexed claims.

What I claim as new and desire to secure by Letters Patent of the United States is:

1. A control system for an electric motor subject to overhauling loads comprising a speed controller for the motor, a mechanical brake for said motor, means mechanically driven by said motor for controlling the braking force of said brake in accordance with changes in the speed of said motor, and means for varying the speed ratio between said motor and driven means in response to operation of said speed controller.

2. A control system for an electric motor subject to an overhauling load comprising in combination a speed controller for said motor, a mechanical brake for said motor, operating means for said brake, a second motor for actuating said operating means, means driven by said first motor for controlling the speed of said second motor thereby to vary the force of said brake in accordance with variations in the speed of said first motor, and means responsive to actuation of said speed controller for varying the drive ratio between said first motor and said driven means.

3. A control system for an electric motor subject to an overhauling load, comprising in combination a master switch for controlling the speed of said motor, a mechanical brake for said motor, operating mechanism for said brake, an alternating current motor for actuating said operating mechanism, a dynamoelectric machine connected to said alternating current motor and driven by said first motor for causing said brake operating mechanism to vary the braking torque in accordance with variations in the speed of said first motor, a variable speed device between said first motor and dynamoelectric machine, and means responsive to actuation of said master switch for controlling said variable speed device.

4. A control system for a main driving motor comprising a master switch for controlling the speed of said motor, a mechanical brake for said motor, operating mechanism for said brake, a motor for actuating said mechanism, a dynamoelectric machine driven by said main motor for supplying a voltage to said brake operating motor varying with variations in the speed of said main motor, a variable speed drive device included in the connections between said main motor and said dynamoelectric machine, and means actuated by said master switch for controlling said variable speed device to vary the drive ratio thereof.

5. A control system comprising in combination, a main motor, a multipoint master switch for controlling the speed of said motor, a mechanical brake for said motor, operating means for controlling the application of said brake, said operating means comprising an alternating current motor, an alternating current machine driven by said main motor for supplying an alternating voltage to said alternating current motor, thereby to vary the braking torque of said brake in accordance with variations in the speed of said main motor, a variable speed device included in the driving connections between said main motor and alternating current machine, and means actuated by operation of said master switch for varying the drive ratio of said variable speed drive in accordance with the operation of said master switch.

6. A control system comprising in combination a main motor, a reversing type multiposition master switch for controlling the speed and direction of said motor, a mechanical brake for said motor, operating mechanism for said brake, said operating mechanism including a second electric motor, an electric machine driven by said main motor for supplying to said second motor a voltage varying with the speed of said main motor thereby to control the braking torque of said brake in accordance with variations in the speed of said main motor, means responsive to actuation of said master switch for one direction of rotation for establishing connections between said electric machine and second motor and responsive to actuation of said master switch in the opposite direction for interrupting said connections, a variable speed drive device between said main motor and electric machine, and means responsive to actuation of said master switch for varying the ratio of said drive device in accordance with the operation of said master switch.

7. A control system comprising in combination a main alternating current motor, a multipoint master switch for controlling the speed of said motor, a mechanical brake for said motor, operating means for said brake including a second alternating current motor, a frequency changer driven by said main motor for supplying to said second motor a voltage of a frequency varying inversely with variations in the speed of said main motor thereby to vary the braking torque of said brake in accordance with variations in the speed of said main motor, a variable speed driving device included in the driving connections between said main motor and said frequency changer, and means responsive to actuation of said master switch for varying the drive ratio of said variable speed device whereby said frequency changer is caused to operate at predetermined percentages of its synchronous speed for selected speeds of said main motor.

8. A motor control system for hoists and the like comprising in combination an alternating current main driving motor subject to overhauling loads, a multipoint reversing type master switch for controlling the speed and direction of rotation of said motor, a mechanical brake for said motor, operating mechanism for said brake including a second alternating current electric motor, means responsive to actuation of said master switch in the hoisting direction for energizing said second motor to release said brake, a frequency changer driven by said main motor for producing a voltage of a frequency varying inversely with variations in the speed of said main motor, means responsive to actuation of said master switch in the lowering direction for connecting said second motor to said frequency changer to provide for varying the braking torque of said brake in accordance with variations in the speed of said main motor, a variable speed drive device in the driving connections between said main motor and frequency changer, and means responsive to actuation of said master switch for varying the drive ratio of said variable speed device in accordance with operation of said master switch.

9. A control system comprising in combination, a main driving motor, a mechanical brake therefor, a master switch for controlling the speed thereof, an electro-hydraulic brake operator having an electric driving motor, means driven by said main motor for supplying a voltage to said operator motor varying with variations in the speed of said main motor, a variable speed drive in the driving connections between said means and said main driving motor, and means responsive to actuation of said master switch for varying the drive ratio of said variable speed drive.

10. A control system comprising in combination, a main driving motor, a mechanical brake therefor, a master switch for controlling the speed thereof, an electrohydraulic brake operator having an alternating current driving motor, a frequency changer driven by said main motor for supplying to said operator motor a voltage having a frequency varying inversely with variations in the speed of said main motor, a variable speed drive included in the driving connections between said main motor and frequency changer, and means operated by said master switch for varying the drive ratio of said variable speed drive whereby said frequency changer is operated at a predetermined percentage of its synchronous speed for all speeds of said main motor.

CARL SCHIEBELER.